Jan. 17, 1956  J. D. McMANUS ET AL  2,731,282
SHAFT SEAL

Filed Feb. 4, 1953

INVENTORS
JOSEPH D. McMANUS, DECEASED BY
CECELIA D. McMANUS, EXECUTRIX &
OLIVER E. DUEMLER

BY *Robert J. Henderson*

THEIR ATTORNEY

Jan. 17, 1956 J. D. McMANUS ET AL 2,731,282
SHAFT SEAL
Filed Feb. 4, 1953 2 Sheets-Sheet 2

INVENTORS
JOSEPH D. McMANUS, DECEASED BY
CECELIA D. McMANUS, EXECUTRIX &
OLIVER E. DUEMLER
BY
THEIR ATTORNEY

United States Patent Office 2,731,282
Patented Jan. 17, 1956

2,731,282
SHAFT SEAL

Joseph D. McManus, deceased, late of Greenwich, Conn., by Cecilia D. McManus, executrix, Greenwich, Conn., and Oliver E. Duemler, Pasadena, Calif., assignors to Walworth Company, Boston, Mass., a corporation of Massachusetts Application February 4, 1953, Serial No. 335,142

3 Claims. (Cl. 286—27)

This invention relates to shaft seals and more particularly to stuffing boxes. A principal object of this invention is to improve such devices.

A common type of stuffing box utilizes a plastic packing composition forced under pressure into a confined space surrounding a movable shaft with which a seal is to be effected. The plastic packing engages sealing rings to force the same into sealing engagement with the shaft and adjacent stationary structure. However, with present devices, the plastic packing composition also engages the shaft and inhibits movement thereof. A principal object of this invention is to prevent the plastic packing from contacting the movable element in this type of stuffing box.

Another object of this invention is to prevent contact between the movable member in a stuffing box assembly and any material having a relatively high coefficient of friction.

Another object of this invention is to form stuffing box sealing rings in such a manner that contact between the movable element and the plastic packing of the stuffing box will be precluded.

Another object of this invention is to utilize a material having a relatively low coefficient of friction for the sealing elements in a stuffing box, the configuration of such elements being such as to utilize the relatively frictionless characteristic of such material to maintain frictional forces in the stuffing box at a minimum.

Another object of this invention is to utilize a pliable material for the sealing elements in a stuffing box, the configuration of such elements being such as to permit limited extrusion of the elements between a movable shaft and adjacent stationary structure to thereby effect a fluid tight seal.

Another object of this invention is to eliminate the necessity for movable glands on stuffing boxes and to simplify the assembly of a fluid-tight shaft seal.

The stuffing box of this invention is intended primarily for use on valves and is equally useful in gate valves, globe valves, angle valves and lubricated or non-lubricated plug valves. However, its use is not restricted to valves and it may be used in any application where a stuffing box finds utility.

A preferred embodiment of the invention may include a relatively stationary structure surrounding a shaft with an annular recess formed in such structure adjacent the shaft. An annular sealing unit is disposed in the recess with the end portions thereof engaging the end walls of the recess and the medial portion thereof engaging the shaft. At least the medial portion of the sealing unit is formed of a material having a relatively low coefficient of friction and it is held against the shaft by a plastic packing composition forced under pressure into the space between the sealing unit and the walls of the recess. The plastic packing composition also urges the end portions of the sealing unit against the end walls of the recess to ensure a fluid-tight seal therebetween. The plastic packing composition thus supplies the required sealing pressure but the shaft is shielded from this material by the sealing unit so that the packing composition cannot produce a high frictional drag on the shaft.

Other objects and advantages will appear from the following specification taken in connection with the accompanying drawings wherein.

Figure 1:
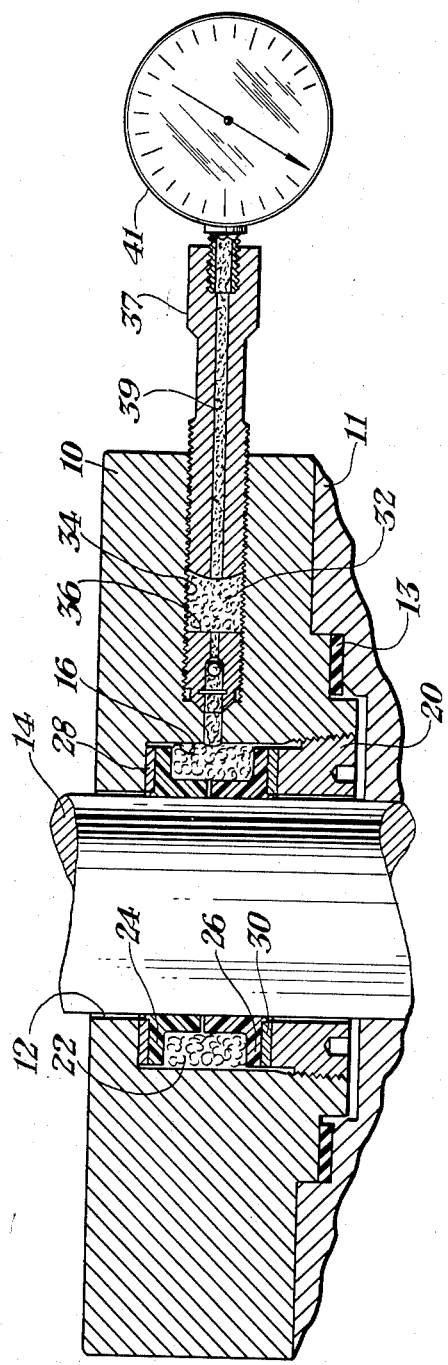
Fig. 1 is a cross-sectional view of a stuffing box embodying this invention.

Referring to Fig. 1 of the drawings, the stuffing box is shown as comprising a hub member 10 with a bore 12 extending therethrough for the reception of a shaft 14 which is adapted for reciprocatory or rotary motion or a combination of the two. The hub member 10 is secured to a valve casing 11 by any suitable means (not shown) and a gasket 13 clamped between the hub and casing prevents leakage therebetween. The shaft 14 carries a valve member (not shown) which may be of any type such as plug, globe, gate, etc.

The bore 12 is counterbored at 16 and an annular gland 20 is threaded into the counterbore. The internal diameter of the gland 20 is substantially equal to the diameter of the bore 12 so that the gland 20 cooperates with the walls of the counterbore 16 to define an annular recess 22 adjacent the shaft 14. As will become apparent hereinafter, the gland 20 is utilized merely to facilitate assembly and the recess 22 may be machined in the hub 10.

An annular sealing unit is disposed within the recess 22 and is comprised of a pair of juxtaposed flexible sealing rings 24, 26. The sealing rings 24, 26 are generally L-shaped in cross-section each being comprised of an axially extending flange and a radially extending flange. The axial flange of each ring engages the shaft 14 and extends toward the corresponding axial flange of the other ring.

The radially extending flanges of the sealing rings 24, 26 respectively engage a pair of flat rings 28, 30 which are positioned within the recess 22 in engagement with the radially extending walls thereof. The internal diameter of the rings 28, 30 is selected to provide the minimum allowable clearance between the inner peripheral walls of these rings and the shaft 14 thereby eliminating the necessity for accurate machining of the walls of the recess 22.

The gland 20 is adjusted to position the ends of the axially extending flanges of the sealing rings 24, 26 as close to each other as possible without overlapping so that the rings 24, 26 close the open end of the recess 22 to define a substantially closed chamber. This chamber is adapted to be filled with a plastic packing composition 32 supplied under pressure through a passage 34 formed in the hub member 10. The passage 34 communicates with the chamber 22 and contains a suitable check valve fitting 36 threaded into the walls thereof. The pressure of the plastic packing composition 32 may be adjusted by manipulation of a threaded plug 37 which is threaded into the passage 34 and which will increase the pressure as it moves into the passage 34. The plug 37 is provided with an axially extending bore 39 which terminates in a tapped counterbore adapted to receive a pressure gage 41. Since the bore 39 communicates with the passage 34, the pressure of the plastic packing composition in the passage 34 will be registered on the gage 41. After the desired pressure is attained, the plug 37 and the gage 41 may be removed and replaced by an imperforate threaded plug (not shown). Such imperforate plug would serve to seal the passage 34 against leakage and would be available to force additional plastic packing composition into the chamber 22 and increase the pressure on the plastic packing composition if necessary.

In accordance with this invention the sealing rings 24, 26 are made of a pliable, deformable material having a relatively low coefficient of friction, preferably a synthetic plastic such as a polymerized tetrafluoroethylene of the type disclosed in Patent No. 2,230,654 and currently marketed under the trademark "Teflon." Other materials having the desired characteristics of low coefficient of friction, combined with low resistance to deformation and high resistance to corrosion, heat and chemical action may be used.

When the plastic packing composition 32 is admitted to the recess 22 under pressure, the axially extending flanges of the sealing rings 24, 26 are forced against the shaft 14 and the radially extending flanges thereof are forced against the rings 28, 30. However, since the axially extending flanges of the sealing rings 24, 26 extend into intimate proximity with each other, little or none of the plastic packing composition 32 will come into contact with the shaft 14. Thus the frictional drag on the shaft 14 will be minimized because of the low coefficient of friction of the material which engages the shaft.

The use of a pliable, deformable synthetic plastic or resin such as a polymerized tetrafluoroethylene, for sealing rings having the configuration disclosed has an additional advantage in that some of such material tends to be extruded into the space between the rings 28, 30 and the shaft 14 to form an efficient fluid tight seal when pressure is applied thereto by the plastic packing composition.

It has been found, that with this arrangement, a fluid-tight seal is assured if a predetermined pressure is applied to the plastic packing composition 32. For example, a packing pressure approximately three times the pressure of the fluid to be sealed may be used. Thus the necessity for hydrostatic testing of the seal while adjusting a gland has been eliminated and the pressure indicated by the gage 41 is an accurate indication of the effectiveness of the seal. The gage 41 may be detached after assembly of the stuffing box or may be left as shown for inspection purposes.

Figure 2:
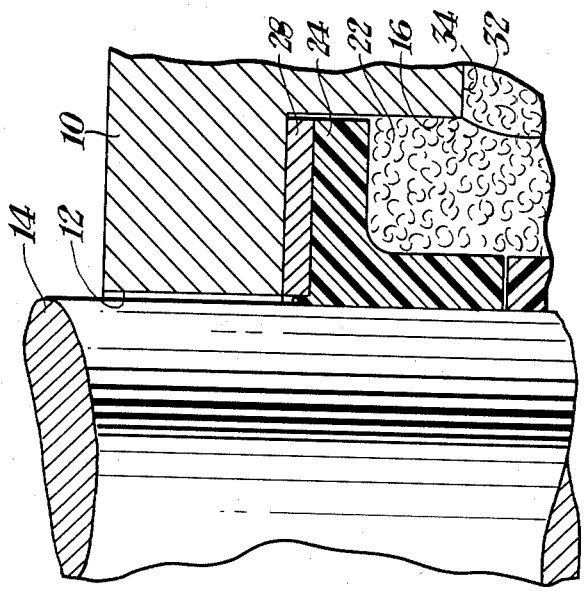
Fig. 2 is an enlarged fragmentary sectional view showing a portion of the stuffing box of Fig. 1.
Figure 3:
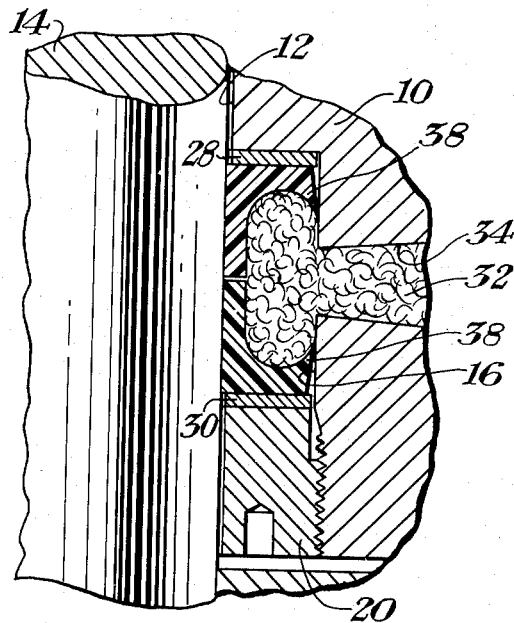
Fig. 3 is a fragmentary sectional view of another form of stuffing box embodying this invention.

The modified construction illustrated in Fig. 3, in which like numerals designate corresponding parts heretofore described, is a departure from that shown in Figs. 1 and 2 in that the cross-section of each sealing ring corresponds substantially to the configuration of the letter J. Thus, a second axially extending flange 38 is provided and the same is pressed against the axial wall of the counterbore 16 by the plastic packing composition 32 to provide an additional fluid seal and prevent possible leakage around the rings 28, 30.

Figure 4:
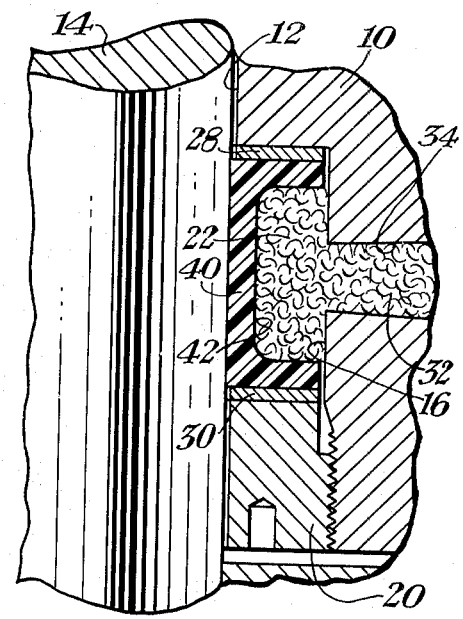
Fig. 4 is a fragmentary sectional view of another form of stuffing box embodying this invention.

The modified construction illustrated in Fig. 4, in which like numerals designate corresponding parts heretofore described, is a departure from that shown in Figs. 1 and 2 in that the annular sealing unit is comprised of a unitary annular element 40 having an annular groove 42 formed in the outer periphery thereof to register with the recess 22. Thus, the possibility of any contact between the plastic packing composition 32 and the shaft 14 is precluded.

Figure 5:
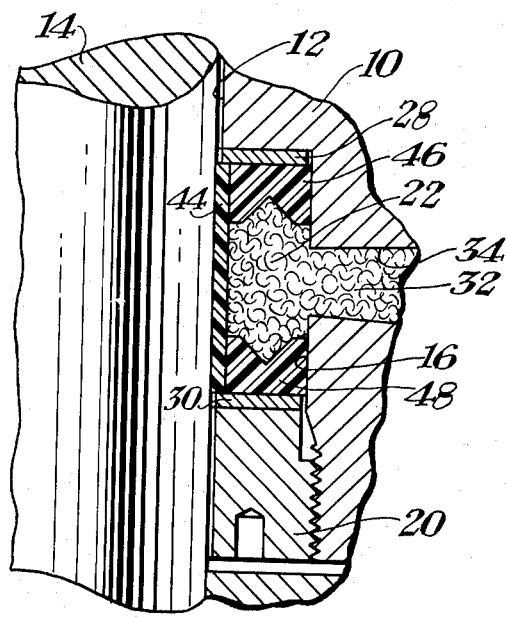
Fig. 5 is a fragmentary sectional view of another form of stuffing box embodying this invention.

The modified construction illustrated in Fig. 5, in which like numerals designate corresponding parts heretofore described, is a departure from that shown in Figs. 1 and 2 in that the annular sealing unit is comprised of a sleeve 44 encompassing the shaft 14 and engaging at each end with a chevron packing ring 46, 48. The packing rings 46, 48 are seated in the recess 22 with their axially extending flanges projecting toward each other so that the plastic packing composition 32 will force such flanges into engagement with the sleeve 44 and the cylindrical wall of the counterbore 16. With such an arrangement, the sleeve 44 precludes contact between the plastic packing composition 32 and the shaft 14.

Since the packing rings 46, 48 do not engage the movable shaft 14, it will be apparent that they may be made of any suitable material without regard to the coefficient of friction thereof. However, since the sleeve 44 engages the shaft 14, it is made of a synthetic plastic or resin having a relatively low coefficient of friction such as the aforementioned polymerized tetrafluoroethylene. The synthetic plastic which forms the sleeve 44 is preferably deformable under the pressure exerted thereon by the packing composition 32 so that such pressure tends to cause limited extrusion of the sleeve 44 into the space between the rings 28, 30 and the shaft 14 to form a fluid tight seal therebetween.

Figure 6:
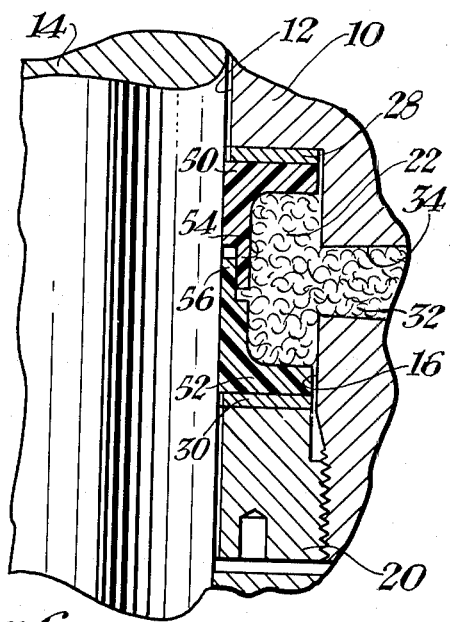
Fig. 6 is a fragmentary sectional view of still another form of stuffing box embodying this invention.

The modified construction illustrated in Fig. 6, in which like numerals designate corresponding parts heretofore described, is a departure from that shown in Figs. 1 and 2 in that the annular sealing unit is comprised of a pair of overlapping sealing rings 50, 52 of generally L-shaped cross-section. The inner peripheral wall of the axial flange of the sealing ring 50 and the outer peripheral wall of the axial flange of the sealing ring 52 are cut away to provide complementary portions 54, 56 permitting the axial flanges of the rings 50, 52 to overlap without causing either of said flanges to be deflected away from the shaft 14. With such an arrangement, the axial length of the sealing unit may be adjusted to compensate for variations in the dimensions of the recess 22 resulting from manufacturing tolerances while still preventing contact between the plastic packing composition 32 and the shaft 14.

It will be apparent from the foregoing that the illustrated embodiments eliminate excessive frictional drag in stuffing boxes utilizing plastic packing compositions and obviate the possibility of contact between such plastic packing composition and the relatively movable element in the stuffing box. It will also be apparent that the illustrated embodiments of the invention provide new and improved stuffing boxes and accordingly accomplish the objects of the invention. On the other hand, it will be obvious to those skilled in the art that the illustrated embodiments may be variously changed and modified, or features thereof, singly or collectively, embodied in other combinations than those illustrated without departing from the scope of the invention or sacrificing the advantages thereof, and that accordingly the disclosures hereto in are illustrative only and the invention is not limited thereto.

It is claimed and desired to secure by Letters Patent:

1. In a stuffing box for a shaft, the combination of a member having an annular recess adapted to extend around the shaft, said recess having an open end and an oppositely disposed side wall, a packing gland for closing said open end of said recess and forming a side wall spaced from the first said side wall, a pair of sealing rings of synthetic plastic material having a relatively low coefficient of friction and each having an annular flange extending axially adjacent the inner circumference of said rings, said rings being seated respectively upon said side walls with said flanges extending toward each other for defining an annular chamber with the peripheral wall of said recess, said packing gland being adapted to position the ends of said flanges in proximate relation to each other for substantially closing said chamber adjacent the shaft, and means communicating with said peripheral wall of said recess for receiving a plastic packing under pressure for transmission into said chamber for urging said rings into sealing engagement with said member and shaft.

2. The combination claimed in claim 1 wherein said rings are each provided with an annular flange extending axially adjacent the outer circumference of said rings, said outer annular flange being relatively shorter than said inner annular flange and providing an additional seal adjacent said peripheral wall of said recess.

3. The combination claimed in claim 1 wherein said annular flanges overlap, at least one of said flanges being recessed to slidably receive a portion of the other of said flanges.

References Cited in the file of this patent

UNITED STATES PATENTS

| | | |
|---|---|---|
| 246,185 | Monroe | Aug. 23, 1881 |
| 574,353 | Garlock | Dec. 29, 1896 |
| 1,800,085 | Kroeger et al. | Apr. 7, 1931 |
| 2,122,560 | De Florez | July 5, 1938 |
| 2,164,380 | Boyd | July 4, 1939 |
| 2,273,129 | Messinger | Feb. 17, 1942 |
| 2,307,346 | Allen | Jan. 5, 1943 |
| 2,313,308 | Allen | Mar. 9, 1943 |
| 2,322,269 | Allen | June 22, 1943 |
| 2,430,918 | Curry | Nov. 18, 1947 |
| 2,465,848 | Collins et al. | Mar. 29, 1949 |
| 2,504,936 | Payne | Apr. 18, 1950 |
| 2,567,527 | Parks | Sept. 11, 1951 |